United States Patent [19]

Baba

[11] Patent Number: 4,622,622
[45] Date of Patent: Nov. 11, 1986

[54] HEADLAMP SYSTEM FOR SMALL VEHICLES

[75] Inventor: Masayoshi Baba, Saitama, Japan

[73] Assignee: Honda Giken Kogyo Kabushiki Kaisha, Tokyo, Japan

[21] Appl. No.: 714,048

[22] Filed: Mar. 19, 1985

Related U.S. Application Data

[63] Continuation of Ser. No. 540,426, Oct. 7, 1983, abandoned.

[30] Foreign Application Priority Data

Oct. 8, 1982 [JP] Japan .................. 57-177327

[51] Int. Cl.⁴ ............................................. B60Q 1/06
[52] U.S. Cl. ........................................ 362/65; 362/66; 362/72
[58] Field of Search .............. 362/63, 64, 65, 66, 362/67, 68, 69, 70, 72; 296/78.1; 180/219; 280/289 S

[56] References Cited

U.S. PATENT DOCUMENTS

| | | | |
|---|---|---|---|
| 2,792,899 | 5/1957 | Piatti ........................ | 296/78.1 X |
| 3,742,205 | 6/1973 | Beauregard et al. ......... | 362/65 |
| 4,135,758 | 1/1979 | Clements ................... | 296/78.1 |
| 4,246,628 | 1/1981 | Ikemizu et al. ............. | 362/66 X |
| 4,282,561 | 8/1981 | Yano ........................ | 362/65 |
| 4,356,536 | 10/1982 | Funabashi et al. ......... | 362/72 |
| 4,462,481 | 7/1984 | Kawasaki et al. .......... | 180/219 X |
| 4,516,191 | 5/1985 | Moriyama et al. .......... | 362/66 |

FOREIGN PATENT DOCUMENTS

| | | | |
|---|---|---|---|
| 1142921 | 9/1957 | France ...................... | 296/78.1 |
| 2099974 | 12/1982 | United Kingdom ......... | 362/66 |

*Primary Examiner*—Magdalen Y. C. Greenlief
*Attorney, Agent, or Firm*—Lyon & Lyon

[57] ABSTRACT

A headlamp system for use in vehicles having a front leg shield. The headlamp system has a cavity formed within the front leg shield. A headlamp is pivotally mounted within the cavity and is connected to a motor driven shaft which can be used to raise the headlamp to an upright vertical position by means of rotating the shaft. The headlamp assembly includes a lid member which forms a continuous surface with the front leg shield when the headlamp is not in use and has been retracted within the cavity located in the front leg shield.

5 Claims, 4 Drawing Figures

HEADLAMP SYSTEM FOR SMALL VEHICLES

BACKGROUND OF THE INVENTION

This application is a continuation of application Ser. No. 540,426, filed Oct. 7, 1983, and now abandoned.

This invention relates to headlamp systems and, in particular, those systems that are useful with motorcycles, motor tricycles, and other small vehicles.

Heretofore, motorcycles have been provided with a front wheel and a rear wheel, and a motor disposed therebetween. The front wheel has been suspended and supported by a front fork having a steering handle mounted atop the upper end of the front fork. A handle cover is installed around the steering handle, the various meter display units, such as the speedometer, fuel meter and the like being mounted within the rear or driver's side of the handle cover. Lamps, such as a headlamp and turn signal lamps, have been mounted on the front side of the handle cover. In order to accommodate headlamps with the necessary luminous intensity required for driving the vehicles on the roadways at night, relatively large headlamps have been employed which have necessitated that the handle cover and handle section of the vehicle be quite large.

SUMMARY OF THE INVENTION

This invention provides for the locating of the headlamp assembly within the front leg shield of small vehicles, such as motorcycles and motor tricycles, thereby allowing for the reduction in size and weight of the handle cover and handle section of the motorcycle. This provides for the efficient utilization of the space located within the front leg shield with the accompanying reduction in size of the handle area thereby streamlining the vehicle. This invention further provides for improved appearance of the vehicle and increased freedom in layout from the viewpoint of design.

A headlamp system is mounted within a cavity located in the front of the front leg shield. A motor driven shaft may be located within the cavity and can be pivotally connected to the rear of the headlamp such that by rotating the shaft the headlamp may be pivoted upward to a vertical position from within the cavity such that the headlamp is facing in a frontward direction from the vehicle. When the headlamp is not needed the headlamp may be retracted within the cavity by rotating the shaft in the opposite direction thereby causing the headlamp to pivot downward to a position within the cavity.

The headlamp system may be further provided with a pivotable lid member which is pivotally connected to the upper portion of the front leg shield and which is also pivotably connected to the headlamp such that the pivotable lid member forms a continuous surface with the exterior of the front leg shield when the headlamp is pivoted downward within the cavity. When the headlamp is pivoted into the upright position, the lid member pivots upward about the upper end of the front leg shield and above and away from the headlamp.

Accordingly, it is an object of the present invention to provide a headlamp system to be used with motorcycles, motor tricycles, and other small vehicles having a front leg shield. Other and further objects and advantages of the present invention will appear thereafter.

BRIEF DESCRIPTION OF THE DRAWINGS

The following drawings will illustrate the embodiments of the present invention.

DETAILED DESCRIPTION OF THE INVENTION

Figure 1:
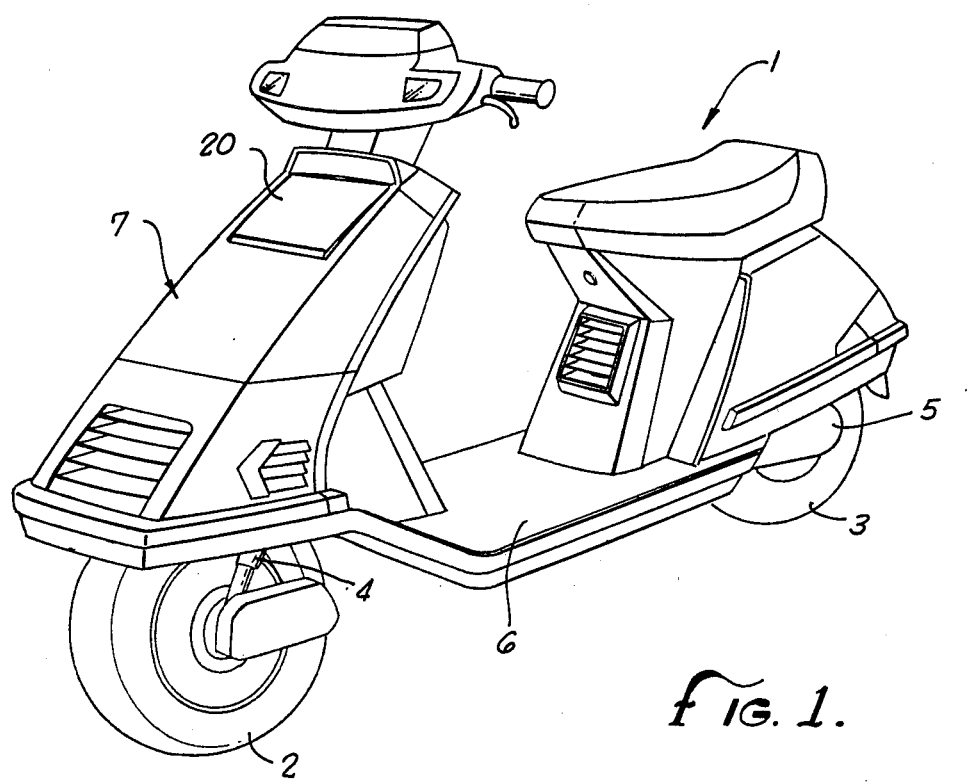
FIG. 1 is a perspective view of a motorcycle having a front leg shield wherein a headlamp assembly is located within the front leg shield.

A motorcycle 1 is shown in FIG. 1. The motorcycle has a front wheel 2 and a rear wheel 3 which are attached to a front fork 4 and a rear fork 5, respectively. The front fork and rear fork are connected to each other by means of a frame 6. Mounted on the frame 6 is a front leg shield 7.

Figure 2:
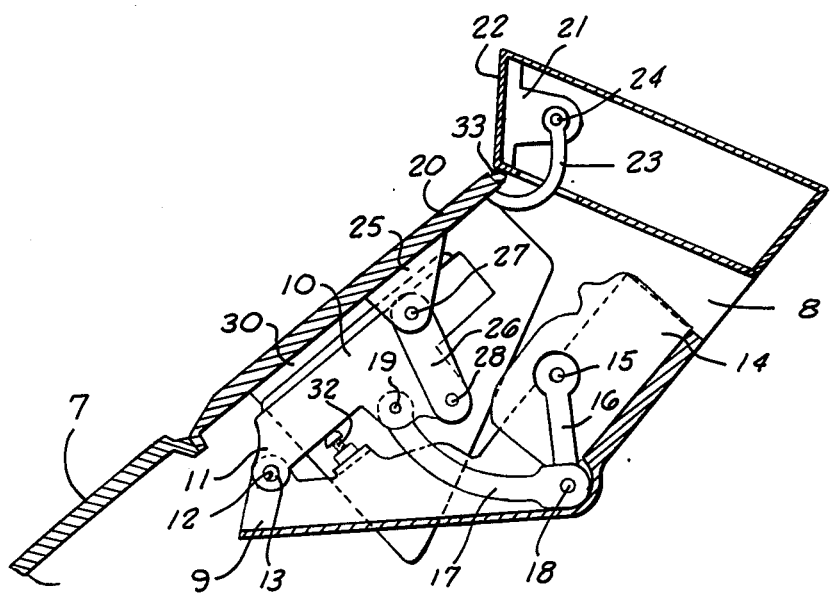
FIG. 2 is a cross-sectional side view of the headlamp assembly recessed within the cavity in the front leg shield.
Figure 3:
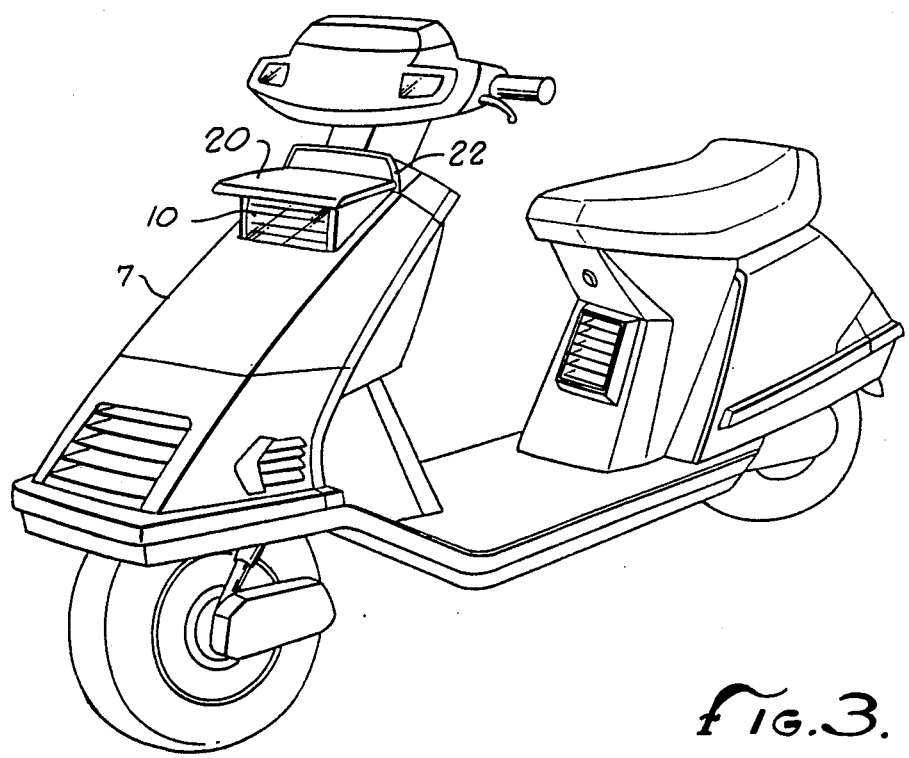
FIG. 3 is a perspective view of a motorcycle showing the headlamp assembly in the upright position.

As shown in FIG. 2 a cavity 8 is located within the upper portion of the front leg shield 7. A support bracket 9 is mounted against the rear interior surface of the front leg shield 7 such that the front portion of the bracket forms the lower boundary of the cavity 8. A headlamp 10 is pivotally connected on each side to the bracket 9 as shown in FIG. 2 by means of lower pivot arms 11 each of said pivot arms 11 having an aperture 12 through which is extended a peg 13 which extends inward from each of the side walls of the bracket 9. A motor 14 is mounted in the upper rear portion of the bracket 9 as shown in FIG. 2. A shaft 15 extends outward from the side of the motor 14. The shaft 15 may be rotated to a predetermined position by means of the motor 14. A rotating arm 16 is rigidly attached to the shaft 15 at its upper end as shown in FIG. 2. The lower end of the rotating arm 16 is pivotally connected to a connecting rod 17 by means of a pivot pin 18 which is inserted through apertures in both the rotating arm 16 and the connecting rod 17. The opposite end of the connecting rod 17 is pivotally connected to the rear of the headlamp 10 by means of a pivot pin 19 which is inserted through an aperture in the end of the connecting rod 17.

As shown in FIG. 2 the headlamp is situated within the cavity 8. When the headlamp 10 is in this position the cavity 8 is closed by means of a lid member 20 which is connected to a bracket 21 located within the front portion of the upper section 22 of the front leg shield. The lid member 20 is connected to the bracket 21 by means of a curved connecting rod 23 one end of which is rigidly connected to the rear of the lid member 20 the other end being attached to the bracket by means of a pivot pin 24 which extends outward from the side of the bracket 21 passing through an aperture in the end of the connecting rod 23. The lid member 20 is connected at approximately its midpoint to the headlamp by means of a pair of support arms 25 which extend downward within the cavity 8 on each side of the lid member 20. A connecting rod 26 is pivotally attached to each of the supports 25 by means of pivots pins 27 which extend inward from each support arm 25. The opposite end of each connecting rod 26 is pivotally attached to the rear of the headlamp 10 by means of pivot pins 28 as shown in FIG. 2.

Figure 4:
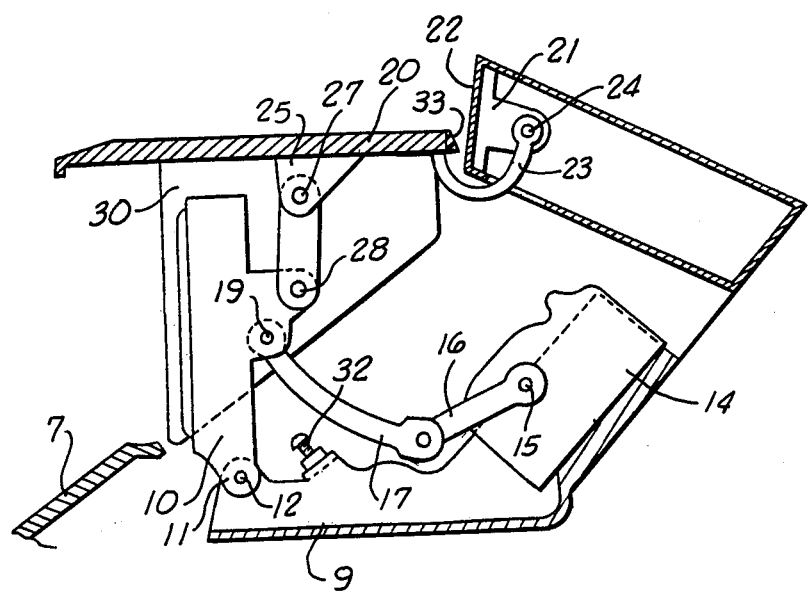
FIG. 4 is a cross-sectional side view of the headlamp assembly in the upright position.

The headlamp assembly described above is shown in the upright position in FIG. 4. The motor 14 rotates the shaft 15 through a predetermined angle thereby rotating the rotating arm 16 in an upward direction which in turn raises the connecting rod 17 thereby exerting an upward force on the headlamp 10 causing it to pivot upward about pivot pin 12 at the same time causing the lid member 20 to pivot upward about pivot pin 24 to a horizontal position as shown in FIG. 4. As shown in this position the headlamp is facing in a frontward direction and is not obstructed by the lid cover 20.

In the preferred embodiment side walls 30 extend inward from each side of the lid member 20. In addition, a stop 32 is mounted on the front face of the bracket 9 such that when the headlamp 10 is rotated downward within the cavity 8 the rear side of the headlamp rests against the stop 32 as shown in FIG. 2. In addition, a weather strip 33 is attached to the upper edge of the lid member 20 to prevent dirt and debris or the weather elements from entering the cavity when the lid member is closed.

While embodiments and applications of this invention have been shown and described in great detail, it should be apparent to those skilled in the art that many more modifications are possible without departing from the inventive concepts herein. The invention therefore is not to be restricted except in the spirit of the appended claims.

What is claimed is:

1. A motorcycle having a headlamp system comprising:
   a front leg shield on the motorcycle, said front leg shield having a forward opening cavity therein,
   a headlamp support bracket positioned inside said front leg shield behind the forward opening of said cavity to define at least the lower boundary of said cavity,
   pivot arms pivotally mounted to said headlamp support bracket,
   a headlamp connected to each side to said pivot arms, said headlamp pivoting on said pivot arms from a position forward in said cavity to a vertical position such that said headlamp projects light forward from said motorcycle,
   means for pivoting said headlamp into said forward position in said cavity including a motor driven shaft, a rotating arm rigidly attached to one end to said shaft, a connecting rod pivotally attached at one end to the other end of said rotating arm and pivotally attached at the other end to the rear of said headlamp such that rotation of said shaft pivots said headlamp into said vertical position,
   a lid for closing said forward opening cavity in said front leg shield, said lid including a curved connecting rod rigidly attached thereto at one end and pivotally connected at the other end to a pivot bracket mounted behind said front leg shield, and
   lid opening means including a lid connecting rod pivotally connected at one end to said headlamp and pivotally connected at the other end to said lid such that said lid is pivoted upward and outward from the forward opening in said cavity upon said pivoting of said headlamp.

2. The motorcycle defined in claim 1 wherein said lid includes weather strip means at the upper edge thereof sealably engaging with said opening in said front leg shield when said lid closes said opening.

3. The motorcycle defined in claim 1 wherein said lid forms a continuous surface with the exterior of said front leg shield when said headlamp is pivoted into said cavity.

4. A motorcycle having a headlamp system comprising:
   a front leg shield on the motorcycle, said front leg shield having a forward opening cavity therein,
   a headlamp support bracket positioned inside said front leg shield behind the forward opening of said cavity to define at least the lower boundary of said cavity,
   pivot arms pivotally mounted to said headlamp support bracket,
   a headlamp connected at each side to said pivot arms, said headlamp pivoting from a retracted position wherein said headlamp faces upwardly to an upright position wherein said headlamp faces forwardly on the motorcycle,
   a motor for pivoting said headlamp, said motor having an output shaft,
   a rotating arm rigidly attached at one end to said output shaft,
   a connecting rod pivotally attached at one end to the other end of said rotating arm and pivotally attached at the other end to the rear of said headlamp, such that rotation of said output shaft pivots said headlamp between said retracted and upright positions,
   a lid for closing said forward opening cavity in said front leg shield, said lid including a curved connecting rod rigidly attached at the upper portion of said lid at one end and pivotally connected at the other end to a pivot bracket mounted behind said front leg shield, at an upper portion thereof, such that said lid extends downwardly from said connecting rod,
   a lid connecting rod pivotally connected at one end to said headlamp and pivotally connected at the other end to said lid such that said lid is pivoted about said pivot bracket disposed in the upper portion of said leg shield as said headlamp is pivoted about said support bracket disposed in the lower portion of said cavity.

5. A motorcycle having a headlamp system comprising:
   a front leg shield on the motorcycle, said front leg shield having a forward opening cavity therein,
   a headlamp support bracket positioned inside said front leg shield behind the forward opening of said cavity and at a lower portion of said cavity,
   pivot arms pivotally mounted to said headlamp support bracket,
   a headlamp contacted to said pivot arms positioned forwardly on said support bracket, said headlamp pivoting from a retracted position wherein said headlamp faces upwardly to a forward position wherein said headlamp faces forwardly,
   means for providing an upward force on said headlamp to pivot said headlamp from said retracted position to said forward position,
   a lid for closing said forward opening cavity in said front leg shield, said lid being pivotally mounted to an upper section of said front leg shield, and
   lid opening means including a lid connecting rod pivotally connected at one end to said headlamp and pivotally connected at the other end to said lid such that said lid is pivoted upward and outward from the forward opening of said cavity upon said pivoting of said headlamp.

* * * * *